2,969,046
BRAKE BOOSTER UNIT CASING
George E. Kellogg, Miamisburg, and Robert H. Bauman, Dayton, Ohio, assignors to General Motors Corporation, Detroit, Mich., a corporation of Delaware
Filed Aug. 26, 1958, Ser. No. 757,259
9 Claims. (Cl. 121—48)

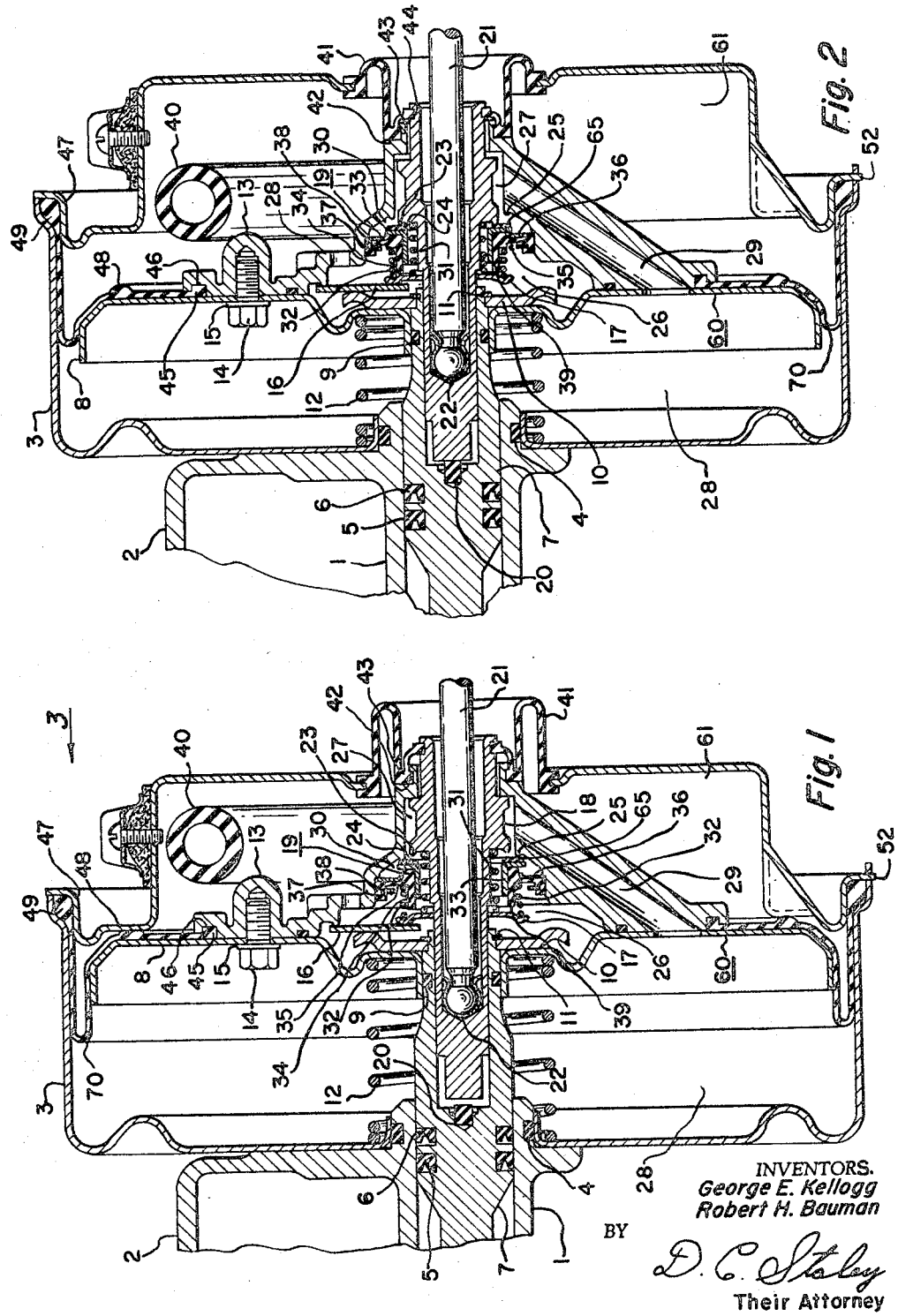

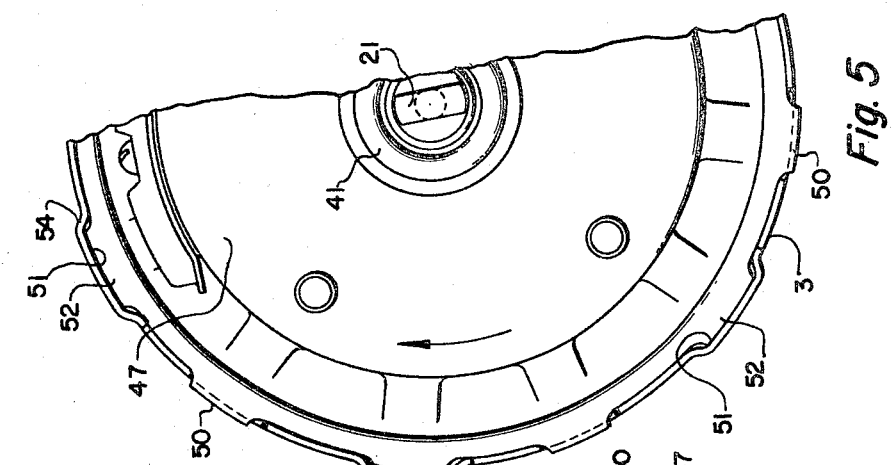
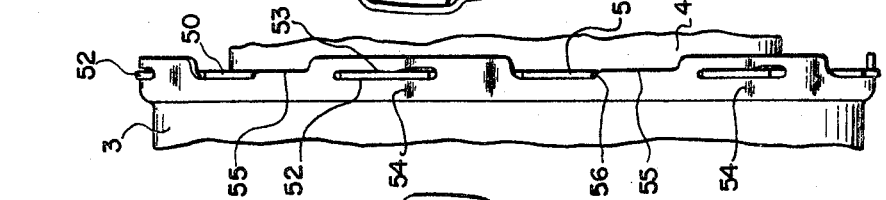
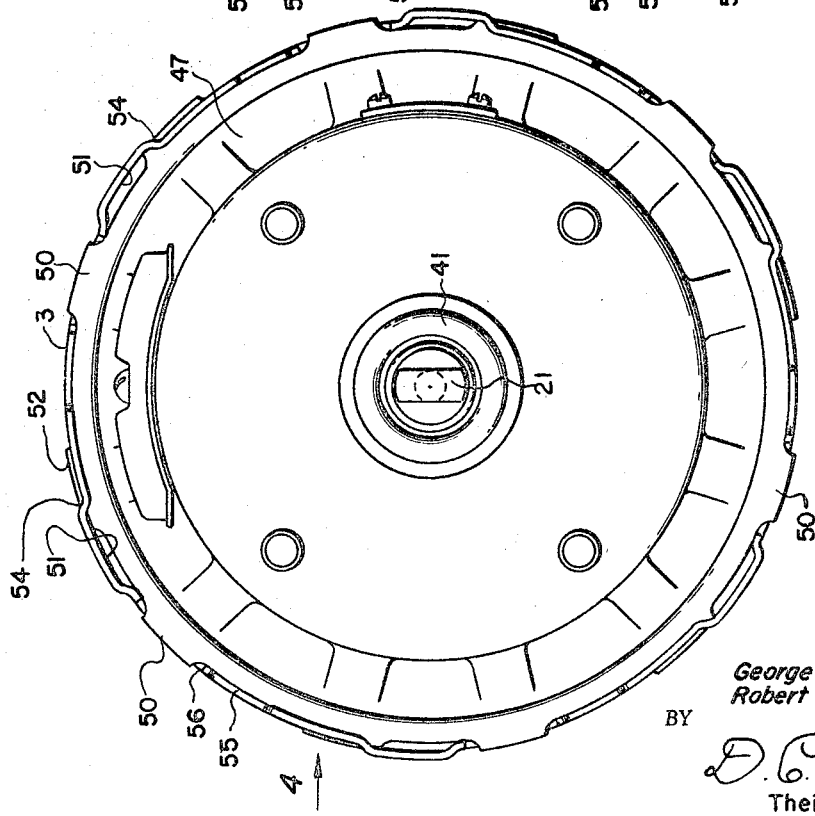

This invention relates to a vehicle braking means and more particularly to a flexible diaphragm power wall in a power brake booster unit.

A rolling diaphragm type power wall provides a means for delivering the full force of the pressure on the power wall into the master piston with minimum friction loss. The assembly of the diaphragm power wall may be improved by employing a diaphragm which is sealed on its outer periphery automatically in assembling the two sections which provide the casing for the power unit. The diaphragm, itself, operates with a rolling stretching action as the power wall moves axially within the power booster unit.

It is an object of this invention to provide a diaphragm in combination with the movable wall or power wall of a booster unit. The diaphgram forms a return fold on its forward portion as the power wall is in the rearward or retracted position.

It is another object of this invention to provide a rolling stretching diaphragm operating with the power wall which is centrally and solely supported by a rearwardly extending portion of the master piston.

It is a further object of this invention to provide a power wall having a rigid portion which retains the inner periphery of a rolling diaphragm by reception of a bead on the diaphragm member. The diaphragm also contains an annularly arranged bead structure on the rearward side of the diaphragm for operation as a bumper for the power wall in its retracted position. The outer periphery of the rolling diaphragm includes an annular bead which is received within the mating sections of the casing for the power unit.

It is a further object of this invention to provide a simple and convenient means for assembling the two sections comprising the power unit housing. These two sections upon assembly produce a seal between the bead on the outer periphery of the rolling diaphragm and the forward and rearward sections comprising the casing for the power unit. The assembling of the casing sections is accomplished by a uniting axial movement in relation to each other upon coaxial alignment and then a rotative movement is provided to lock the sections in position.

The objects of this invention are accomplished by means of a power wall comprising a diaphragm support member, a valve housing, a valve assembly, a reaction device, which are all centrally and solely supported by the rearwardly extending portion of the master piston operating within the master cylinder. The rigid portion of the power wall is directly connected to a bead on the inner periphery of the rolling diaphragm. An annular bead is spaced radially outward on the rearward side of the flexible rolling diaphragm for engaging the rear section of the brake booster casing when the power wall is in a retracted position. The radially outer portion of the flexible diaphragm is in a folded position which extends forward within the power unit. The inner portion of this fold fits about the diaphragm support member for a limited distance and the outer fold of this diaphragm lies adjacent to the inner periphery and the rearward portion of the forward section of the power unit casing. The extreme outer portion of the flexible diaphragm forms a bead which is received between the two mating sections of the power booster unit. Upon assembling of these two sections, this bead is compressed and to thereby provide a fluid seal on the outer periphery of the rolling diaphragm. The assembly of this unit is accomplished by means of a bayonet lock on the two sections of the power unit casing.

The rearward section of the casing is provided with radially extending tabs. These tabs fit into mating axial grooves on the forward section of the casing of the power unit. As the rear section of the casing is axially inserted within the forward section, a certain number of these tabs fit into the mating grooves and the remaining tabs fit flush against the rearward end of the forward casing to provide a stop means. The tabs which fit into the axial grooves are then in axial position for rotation into circumferential slots. These slots are inclined to a plane normal to the centerline of the power unit and provide axial movement of the rearward casing section upon rotation. The movement causes a sealing means on the outer peripheral bead of the diaphragm when the rearward section is rotated in relation to the forward section. The remaining tabs drop into steps on the rearward portion of the forward section and thereby provide a lock to oppose counter-rotation of the forward section in relation to the rearward section of the power brake booster casing.

This type of a booster unit provides for a minimum of friction due to the central mounting of the power wall on the rear end of the master piston. The alignment of the valve mechanism is also provided for by the cylindrical bearing surface of the hollow section in the rearward end of the master piston. This sliding valve which is aligned within the piston also has a hollow section for receiving the push rod which is actuated by manual means. The contact of this push rod is at a point forward of the power wall and thereby eliminates the possibility of misalignment due to cocking of the valve mechanism when the booster unit is operated.

Further objects and advantages of the present invention will be apparent from the following description, reference being had to the accompanying drawings wherein a preferred embodiment of the present invention is clearly shown.

Figure 1 discloses a cross-section view of the power brake booster unit. This view discloses the rolling diaphragm and the power wall including the valve structure and reaction means as well as the centrally supporting master piston. The view shows the vacuum valve in a closed position and the air valve in an open position.

Figure 2 is a cross-section view of the power brake booster unit similar to that of Figure 1 except the vacuum valve is shown in an open position and the air valve is closed and the power wall is moved to a forward or operating position.

Figure 3 is an end view taken from the direction as shown by the arrow 3 in Figure 1 of the power brake booster unit disclosing the radially extending tabs rotated in a locked position.

Figure 4 discloses the side view of the bayonet locking means taken from the direction as shown by the arrow 4 in Figure 3, the tabs are rotated in a locking position as in Figure 3.

Figure 5 is a section of the end view similar to Figure 3 and taken from the same direction as shown by arrow 3 in Figure 1 except the rear section of the casing and forward section of the casing are merely axially aligned and not rotated to the locked position.

The brake power booster unit, as illustrated in the above views, discloses the feature in regard to the rolling diaphragm. The additional disclosure may be referred to in the co-pending application of the same assignee, Serial No. 757,260, filed August 26, 1958. The second co-pending application is Serial No. 757,261, filed August 26, 1958. The latter co-pending application does not disclose a rolling diaphragm power wall but the piston type of power wall. The valve structure and the reaction means within the power piston is of this same general structure. Reference may be made to these co-pending applications on these various elements which are more specifically described in the co-pending applications.

Figure 1 discloses the power brake booster unit with the master piston extending into the master cylinder. The master cylinder 1 is part of a unitary casting structure including the reservoir 2 which is placed directly above the master cylinder. The forward section 3 of the power unit casing is mounted adjacent to and concentric with master cylinder 1. A ring seal 4 is placed between the inner periphery of a rearwardly extending central flange of the forward section of the casing member 3. This ring seal 4 fits into an annular groove on the outer periphery of a rearwardly extending cylindrical portion of the master cylinder 1. Two seals 5 and 6 are also placed in annular grooves on the outer periphery of the master piston 7. These seals 5 and 6 provide means for preventing the fluid within the master cylinder from leaking by into the power unit. The master piston 7 extends rearwardly to provide the supporting means for the diaphragm supporting structure.

The diaphragm support member 8 has an axially extending annular mounting flange extending forward about the rearward portion of the master piston 7. An O ring seal 9 is provided between these two elements. The diaphragm support member is retained in position by means of a reaction disk 10 and a retainer ring 11 which is mounted on the rear end of the power piston. The forward portion of the diaphragm support member 8 is resiliently held in the rearward position by the spring 12. Spring 12 operates between the forward section of the power unit housing and the diaphragm support member 8.

The valve housing 13 is bolted to the diaphragm support member 8 by means of bolts 14 and washers 15. The valve housing 13 extends radially inward and axially rearward to enclose the valve assembly for operating the power booster unit.

Reaction fingers are mounted on the valve housing on the forward side of the valve housing adjacent to the diaphragm support member 8. These reaction fingers 16 are T-shaped when viewed from the end view. They pivot on their radially outer portions of the T. At a point radially inward from this pivot point, the reaction fingers also pivot against a curved portion of the reaction disk 10. The third point of contact of the reaction finger is radially inward on the finger as the reaction finger bears against the curved portion on the reaction plate 17. The reaction fingers in this structure have a single point of contact of the reaction disk 10 on the forward side of the reaction finger and two points of contact on the rearward side of the reaction finger, one being on the valve housing 13 and the second being against the reaction plate 17 which is resiliently connected by springs to the sliding air valve 18 and also the valve housing 13 through the resilient valve seat member 19.

The sliding air valve 18 slidably fits within a hollow cylindrical portion of the master piston 7. At the forward end of this opening, a bumper button 20 is located to avoid shock in event of sudden actuation of the air valve 18 as it contacts the master piston on its forward end of its stroke. This air valve 18 is also provided with a hollow portion extending inward from its rear end for receiving the push rod 21. The push rod 21 fits into a seating element 22 which abuts the forward end of the opening in the sliding air valve 18. The forward end of the sliding air valve 18 slidably fits within the master piston 7 for a sufficient distance to avoid any misalignment of the valve member 18 in its operation against its mating seat.

The air valve member 18 is provided with an annular ridge 23 which moves forward to engage the mating valve seat 24. The vacuum valve is carried on the valve housing and is formed by the annular ridge 25 on the inner periphery of the valve housing 13. This annular ridge 25 operates against the seating portion 65 in concentric relationship with the seating portion 24 and the air valve portion 23. As the air valve is moved forward, the air compartment 26 is closed from the chamber 27. Chamber 27 is in communication with the differential pressure chamber 28 on the forward side of the power wall through passage 29.

Upon further forward movement of the air valve member 18, the vacuum valve 25 is then opened and the vacuum chamber 30 is then in communication with chamber 27 and passage 29 as well as the differential pressure chamber 28 on the forward side of the power wall.

Spring 31 is resiliently mounted between the reaction plate 17 and the radially flanged portion of the air valve member 18. This spring tends to move the air valve member 18 to a retracted position, leaving the air valve portion 23 open. It will be noted that the pressure during the initial operation on the operator's foot known as "feel" is resiliently carried through the spring 31 and the reaction force is carried through the reaction device from the master piston 7. A second spring 32 is also placed between the reaction plate 17 and the resilient portion of the valve seat member 19. The reaction force is carried through the reaction finger 16 to the valve housing 13 and valve seat member 19. This spring holds the vacuum valve 25 in a closed position when the booster unit is in a non-operating position.

The valve seat 24 is bonded to sleeve member 33 having an L-shaped cross-section on either side of its center line. This member 33 is also bonded to the radially inner and rearward surfaces of the cylindrical portion 34 of the valve seat member 19.

The valve seat member 19 being bonded to the metal sleeve 33 which contains a radial flange on its rearward portion eliminates the possibility of deformation of this element in operation. The spring 32 acts on a flange portion of the valve seat member 19. This flange portion 35 is flexible and permits axial movement of the cylindrical portion 34 while a radial outer portion of this member remains in a fixed location in relation to the valve housing 13. The valve housing 13 provides a mounting for a seating ring 36 to reinforce the flexible flange 35 of the valve seating member 19 in the rearward position. The flange portion 35 of valve seating member 19 extends radially outward to an axially rearward extending flange 37. This flange portion 37 fits within the inner periphery of the valve housing 13 and is held in position by a seating ring 38. The cylindrical portion 34 of the resilient valve seat member 19 has a forwardly extending portion 39 which operates as a bumper against the reaction plate 17 in event the push rod is rapidly moved forward.

The conduit 40, comprising a rubber hose, is connected to the vacuum chamber 30. This connection is not disclosed in this application but one of the co-pending applications. The conduit 40 extends outward of the power booster unit and is in communication with a vacuum source such as the manifold of the vehicle engine.

A flexible boot 41 is provided to seal the rear end of the power booster unit. Boot 41 engages the inner periphery of the rear section of the power booster unit casing. An annular bead 42 is received within an annular groove 43 on the valve housing 13. These two connections of the flexible boot prevent the entrance of foreign-material within this portion of the brake booster unit and also forms a vacuum seal. An extension of the boot also engages the sliding air valve 18 in an annular groove 44.

The flexible rolling diaphragm 70 is provided with an annular bead preferably having an annular raised bead on the opposite faces as the mounting means on the inner periphery of the diaphragm. The bead 45 is received within the mating groove 46 in the valve housing 13. The flexible diaphragm is supported on its forward side by the diaphragm support member 8. This portion of the diaphragm 70 extends radially outward and curves forward around the curved portion of the pan-shaped diaphragm support member 8. An additional annular bead is provided on the rear surface of the flexible diaphragm spaced radially outward from the previously described square bead. This annularly arranged bead structure 48, having a generally circular arrangement operates as a bumper for the power wall when the wall is in the non-operating or retracted position. The bumper engages a radial flange on the rear section 47 of the power unit.

The flexible diaphragm extends axially forward and then returns axially rearward in an U-shaped cross-section fold. The flexible diaphragm is reinforced by the forward section 3 of the power unit casing. The flexible diaphragm closely fitting the forward section of the power unit casing from the point of the fold to the bead 49 on the outer periphery of the flexible diaphragm. As the forward section and the rearward section 47 of the power unit casing are assembled, the bead 49 is compressed to provide a tight seal between the two sections.

Figure 3 discloses the end view of the power unit. The two sections 3 and 47 of the power unit are in the rotated or assembled portion and locked as shown in Figure 3 by means of a bayonet lock. The rear section 47 of the casing is provided with radially extending tabs or lugs 50 and 52 as shown in this view. Alternate lugs 52 are received within axially extending grooves 51 of the forward section of the power casing. The remaining tabs 50 abut the rearward end of the casing 3.

Figure 4 shows the side view of the end assembly of the casing units 47 and 3. The lugs 52 are received within slots 53. The slots 53 are angularly spaced about the outer periphery of the rearward end of the front section of the power unit casing 3. These slots are inclined slightly to a plane normal to the axis of the power booster unit. These inclined slots engaging tabs 52 move the rear section 47 of the booster unit axially forward, as the section 47 is rotated, in relation to the forward section 3 of the power booster unit. The slots 53 are cut through the side portion 54 of the axially extending groove 51. The grooves also extend to a point beyond the groove in the rearwardly extending portion of the forward section 3 of the booster unit casing.

The alternate tabs 50 are not received in grooves 51 on the forward section 3 of the power booster casing. These tabs or lugs 50 abut the rearward end at the point 55 of section 3. As the section 47 is rotated in relation to the section 3, the tab 50 does not move axially with tab 51 but becomes bent slightly rearward under a strained condition. As the tab rotates beyond the step or shoulder 56, the tab 50 locks against counter-rotation and disassembling of the casing units 3 and 47.

Figure 5 discloses a view similar to that of Figure 3 except the rear section 47 is merely positioned within the forward section 3. The tabs 52 are received within the annular grooves 51. The tabs 50 abut the rearward end of the front section 3 and thereby provides a stopping means for further axial movement of the rear case 47 in relation to the front case 3. At this point, the tabs 52 are axially aligned with the slots 53. Figure 3 shows section 47 rotated in relation to the section 3, tabs 52 are received within the camming slots 53.

The power booster unit operates in the following manner. As the push rod 21 is moved axially forward, the sliding air valve 18 is carried with the push rod 21. The sliding air valve 18 is moved forward to a position where the annular ring portion 23 is engaging the seat portion 24 of the flexible valve seat member 19. The air valve portion 23 closes off the air chamber 26 from chamber 27 as the valve portion 23 contacts the valve seating portion 24. The valve in this position is compressing air valve spring 31. Further movement of the sliding air valve 18 carries the resilient seating member 19 axially forward and, thereby, unseating the seating portion 65 from the annular ring 25 of valve housing 13. This opens the vacuum chamber 30 for communication with the chamber 27, the chamber 27 being in communication with the differential side of the power wall 28 by means of the passage 29. When the vacuum source is in direct communication with the forward side of power wall 60 or compartment 28 of the power booster unit, the power wall 60 begins to move forward. This movement carries the flexible diaphragm which then unfolds and moves to an outward position along the inner periphery of the forward section of the casing 3. The greater pressure within compartment 61 forces the flexible rolling diaphragm outward against the inner periphery of section 3 as the rolling diaphragm unfolds. The action of the diaphragm in moving the power wall is a rolling and pulling movement as the diaphragm fold moves forward. The diaphragm also increases in diameter as it unfolds against power unit wall. The pressure differential on both sides of the rolling diaphragm is maintained by the inner bead 45 which is tightly sealed within the groove 46 of the valve housing member 13, and the bead 49 which is held under compression within the two sections 3 and 47 of the power unit casing. The rolling diaphragm being of a small thickness and a flexible material provides for minimum drag as the centrally supported power wall moves axially forward.

The power wall 60 moves forward when a reduced pressure exists on the forward side of the power wall in relation to the rearward side of the wall. As the push rod 21 is moved axially forward and the vacuum valve 25 remains open, the power wall will continue in a forward movement. When the push rod 21 is no longer moving forward and is then held in a stationary position, the power wall 60 will move forward until the vacuum valve is closed 25 and then retaining this position. The power wall 60 and the push rod 21 remain in a fixed position as the vacuum valve 25 and air valve portion 23 are in the closed position. The booster unit is in a "hold" position. Further forward movement of the push rod will again create the action as previously described.

Upon release of the brakes, the push rod 21 is retracted thereby permitting the force of the air valve spring 31 to move the sliding air valve rearward. The valve spring 32 operating on the flexible valve seat closes the vacuum valve and the reaction spring opens the air valve. The main spring 12 within the booster unit operating between the forward section 3 of the power unit casing and the forward side of the power wall returns the power wall to the return position and seats the bumper 48 against the rearward section 47 of the power unit casing. During the rearward movement of the power wall, the diaphragm rolls away from the inner periphery of the forward section of the power unit casing. This action is accomplished by means of providing a flexible resilient material for the diaphragm 70 which returns to its original shape. The diaphragm 70 contracts as it rolls from the power unit casing, thereby reforming to its original diameter in its transition to the inner portion of the diaphragm fold. This action of the rolling diaphragm 70 is permitted when the pressure within the forward and rearward compartments of the power unit become equalized.

Figure 2 discloses the power wall in a forward position with the rolling diaphragm moving outward against the inner periphery of the casing section 3. Figure 1 shows the power wall in the rearward position where the annular bead 48 rests against the radial flange of the rear section 43 of the power unit casing.

A further description of the valve operation and the central supporting means for the power wall may be obtained from the co-pending applications previously mentioned in this application.

In assembling of the forward and rearward sections of the power unit casing, a sealing is accomplished by compressing the outer bead 49 of the rolling diaphragm between the mating portions of the two power unit sections. The sealing of this bead is accomplished in this manner. The rearward section of the power unit casing is provided with radially extending tabs about its outer periphery. The forward section of the power unit casing is provided with axial grooves within a rearward portion of the power unit casing. Angularly spaced between these extending portions are flat portions lying in adjacent planes normal to the center line of the axis of the power unit. These two flat portions are connected by means of a shoulder or step portion. As the rearward section is centered on the axial line of the forward section, it is then inserted in the forward portion by a uniting axial movement. By this axial movement, alternate radial tabs of the rear section fit into the mating axial grooves on the forward section. The intermediate tabs fit flush against the rearward end of the forward casing on the most rearward of the flat portions. In this position, the radial tabs of the rear section are in axial alignment for rotation into the angularly spaced circumferential slots in the forward section. These slots, being inclined to a plane normal to the center line of the power unit, provide axial movement of the rear casing section upon rotation of the rear casing section in relation to the front section. This rotating movement causes a sealing means on the outer periphery of the bead of the rolling diaphragm due to the camming action of the radial tabs of the rear section in the inclined slots of the forward section. The remaining intermediate tabs remain in the same axial position but are under a strained condition until they pass over the shoulder portion adjoining the two flat portions in adjacent planes normal to the center line of the power unit. As these tabs move angularly by the shoulder portion, they drop behind the shoulder and contact the forward flat portions of the forward section of the power unit. The shoulder thereby provides a lock to oppose counter-rotation of the rearward section in relation to the forward section of the power booster unit.

While the embodiment of the present invention as herein disclosed constitutes a preferred form, it is to be understood that other forms might be adopted.

What is claimed is as follows:

1. In a power brake unit a diaphragm with supporting means comprising in combination, a power unit casing having two sections, a power wall operating within said power unit casing, said power wall operating in conjunction with a rolling diaphragm, an annular bead on the radially inner portion of said rolling diaphragm forming a seal with said power wall, said power wall providing a reinforcing means on the forward side and radially inward portion of said rolling diaphragm, the outer portion of said rolling diaphragm reinforced by said power unit casing and having the outer edge of said diaphragm mounted between said two sections of said unit casing which are locked in position by means of a bayonet lock.

2. In a brake power unit a diaphragm power wall comprising in combination a power unit casing including a forward and rearward section, a movable wall within said casing dividing said unit casing into a forward and rearward compartment, a rolling diaphragm supported by an annular bead received within said movable wall, an annularly arranged bead structure positioned radially outward on said rolling diaphragm to provide a bumper means for said movable wall on said rearward section of said unit casing, a bayonet locking means provided on the two sections of said power unit casings and having means for receiving an annular bead on the outer periphery of said rolling diaphragm thereby compressing said bead to provide a seal as the two sections of said unit casing are assembled.

3. In a brake power unit a diaphragm power wall comprising in combination a power unit casing including a forward and a rearward section, a movable power wall within said casing dividing said unit casing into a constant pressure compartment and a differential pressure compartment, said movable wall including a rolling diaphragm, the inner periphery of said rolling diaphragm contained within said movable wall and the outer periphery of said rolling diaphragm having an annular bead received between the two sections of said power unit casing, the forward section of said power unit casing containing inclined slots angularly spaced about the outer periphery of the rearward portion of the front section of said power unit casing, said slots inclined to a plane perpendicular to the axis of said power unit, said slots for the reception of radially extending tabs on said rearward section of the casing unit, alternate of said tabs abutting the rearward end of said forward section of said casing, said rearward portion of said front section provided with a locking shoulder for locking said rearward section in a non-rotating position in relation to the forward section when said sections are assembled.

4. In a power brake unit a diaphragm supporting and sealing means comprising in combination a power unit casing including a forward and rearward section, a movable wall operatively placed within said power unit casing, said movable wall employing a flexible rolling diaphragm supported on its inner periphery by said movable wall, said rolling flexible diaphragm supported on its outer periphery by means of a bead on said diaphragm compressibly held between said forward and said rearward sections of said unit casing, the forward section of said power unit casing having axial grooves on its outer periphery, said axial grooves placed within an extended portion on the rear end of said forward section, said extended portion having circumferential slots angularly spaced about the periphery of said forward section, said circumferential slots leading from the one side of said axial grooves, said forward section having flat portions alternately spaced between the said extended portion and having locking shoulders contained on said flat portions, the rearward section of said unit casing having radially extending flange, a predetermined number of said radially extending flanges for reception within said axial grooves of the forward section of said unit casing, the remaining tabs of said rear section abutting the flat portions of the forward section of said unit casing, said shoulder locking portion locking the said remaining tabs in a non-counter rotating position when said rear section is axially united and rotated beyond a certain point in relation to said front section of said power unit casing.

5. In a fluid motor a diaphragm with supporting means comprising in combination a motor casing comprising a forward and rearward section, a power wall including a flexible rolling diaphragm, said rolling diaphragm comprising two annular beads on the rearward side and radially inner portion, the radially innermost bead providing a mounting means for said inner periphery of said diaphragm when received within the central mounting of said power wall, the second said bead providing a bumper means for the return position of said power wall adjacent said rearward section of said casing, said rolling diaphragm disposed in a folded position to form a U-shaped cross-section whereby the inner portion of said wall is reinforced by said power wall with a portion remaining without reinforcement adjacent to the folded portion of said diaphragm, said diaphragm having the reinforced portion about the outer periphery of the outer portion of said U-shaped fold comprising an inner periphery of the motor casing, said outer periphery of said rolling diaphragm comprising a generally tear-drop shape cross-section forming a bead for reception between the two mating portions of the forward and rearward sections of said power casing, said sections of the power unit casing assembled by means of a bayonet lock whereby radially extending tabs of said rear section engage peripheral slots on said forward section, thereby compressing said bead and locking said sections in non-rotative position.

6. In a brake booster unit a diaphragm having sealing and supporting means comprising in combination a booster unit casing including a forward and rearward section, a power wall within said booster unit including a flexible rolling stretching diaphragm, said power wall dividing the interior of said booster unit casing into a constant pressure chamber and a differential pressure chamber, said rolling diaphragm forming a U-shaped fold adjacent the inner periphery of the forward section of said booster unit casing, the extreme outer portion of said rolling diaphragm comprising an annular bead for reception between the mating portions of said forward section of said power booster unit casing and said rearward section of said casing, said forward section comprising axially rearward extending flanges having axial grooves on their inner periphery, said forward section having alternately spaced areas between said extending portions comprising flat areas with an axial step connecting said two flat areas, said rear section of said housing comprising radially extending lugs, a portion of said radially extending lugs for reception within the axially extending grooves in said forward section, the remaining angularly spaced lugs bearing against one of said flat portions on said forward section, cammed slots angularly spaced about the outer periphery of the forward section of said casing for reception of said radial flange of said rear section upon rotation of said rear section in relation to said front section thereby providing a bayonet lock when said front section tabs are rotated beyond said shoulder portions of said front section.

7. In a power brake unit a diaphragm power wall comprising in combination a power unit casing including a forward section and a rearward section, a movable wall including a rolling stretching diaphragm to provide a constant pressure and a differential pressure compartment within said power unit casing, said rolling stretching diaphragm comprising three annular bead structures, the radially innermost providing the mounting means for said rolling diaphragm on said movable wall, the intermediate and annular bead structure providing the bumper means for said movable wall upon return to its rest position on said power unit casing, the radially outermost bead providing mounting means for said rolling diaphragm and a seal when said forward section and said rearward section axially compresses said outermost bead, said forward section of said casing comprising rearwardly extending portions having internal axial grooves angularly spaced from each other, circumferential slots in the outer periphery of said forward section, the one end of said slot beginning in the side of said axial groove and being angularly spaced from each other, said slots slanted slightly from a plane perpendicular to axis of said power booster unit, radially extending tabs from the outer periphery of said rear section, said tabs lying in a plane perpendicular to the axis of said power unit, alternate tabs in said rear casing for reception within said axial grooves of said forward section, the remaining tabs of said rear section abutting against the alternate non-extending portion of said forward section, said non-extending portion provided with a shoulder stop for locking said rear section in a non-rotative position in relation to the forward section upon assembling said two sections of said power unit.

8. In a power unit a diaphragm power wall comprising in combination a power unit casing including a forward and rearward section, a movable wall dividing said inner portion of the power unit casing into a constant pressure and a differential pressure compartment, said movable wall employing a flexible resilient diaphragm including three annularly arranged bead structures formed thereon, the radial innermost bead providing for mounting of said rolling diaphragm on said movable wall, the intermediate annularly arranged bead structure providing a bumper means between said movable wall and said rear section of said booster unit casing, the radial outermost bead providing a sealing means and support means for the outer periphery of said flexible resilient diaphragm, said forward section of said casing provided with axially rearwardly extending portions having axial internal grooves, circumferential slots adjoining one side of said axial slots and extending beyond said axial groove, said groove inclined to a plane perpendicular to the axis of said power unit, the alternate rearward portion of said front section between said extending portion comprising two flat areas connected by a step, said two flat areas on separate planes axially disposed from each other, the said portion adjoining two flat portions providing a shoulder on the rearward end of said forward section, the rearward section having radially extending tabs lying in a plane perpendicular to the axis of said power booster unit, the alternate tabs of said radial tabs on said rear section constructed for reception within said axial grooves of said forward section upon assembly, the alternate remaining tabs providing a stop means in axially assembling said rearward section and said forward section, said step portion of said forward section providing a locking means for retaining said rearward section in a non-rotative position upon assembling with said forward section.

9. In a power brake unit a diaphragm power wall means comprising in combination a power unit casing including a forward and rearward section, a movable wall employing a folding diaphragm, the outer periphery of said folding diaphragm supported within the mating portions of said forward and said rearward sections of the power unit casing, said forward section of said casing comprising a rearwardly extending portion angularly spaced about the outer periphery of said forward section and having axial grooves, the alternate space on the rear end of said forward section comprising two flat portions connected by a shoulder and lying in parallel planes normal to the axis of said power unit, said rear section comprising radially extending tabs in a plane normal to the center line of said power unit, a number of said radially extending tabs for reception within said axial grooves of said forward section upon assembly, the remaining tabs of said rearward section providing a stop means for forwarding axial movement of said rearward section in assembling said rear casing against the most rearward of said flat portions alternately placed between said extended portions, said shoulder portion adjoining said two flat portions providing a locking means when said rear section is rotated in relation to said front section in assembling the two sections of two said power unit casings.

References Cited in the file of this patent

UNITED STATES PATENTS

| | | |
|---|---|---|
| 368,089 | Hinds | Aug. 9, 1887 |
| 1,765,760 | Duty et al. | June 24, 1930 |
| 1,876,882 | Eaton | Sept. 13, 1932 |
| 2,061,898 | De Motte | Nov. 24, 1936 |
| 2,098,665 | Kliesrath | Nov. 9, 1937 |
| 2,292,703 | Lawler | Aug. 11, 1942 |
| 2,455,985 | Elliott | Dec. 14, 1948 |
| 2,658,348 | Stelzer | Nov. 10, 1953 |
| 2,661,863 | Howe | Dec. 8, 1953 |
| 2,738,095 | Carter | Mar. 13, 1956 |
| 2,766,852 | Ingres | Oct. 16, 1956 |
| 2,770,949 | Randol | Nov. 20, 1956 |
| 2,794,320 | Rockwell | June 4, 1957 |
| 2,832,316 | Ingres | Apr. 29, 1958 |